A. D. SMITH.
VEHICLE TORSION ARM.
APPLICATION FILED FEB. 19, 1916.
1,213,031.  Patented Jan. 16, 1917.
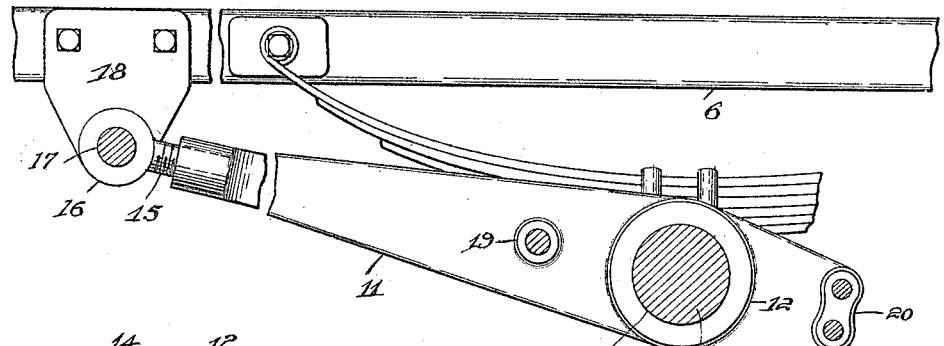
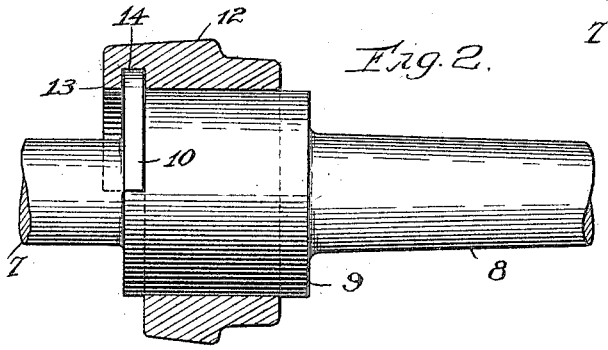
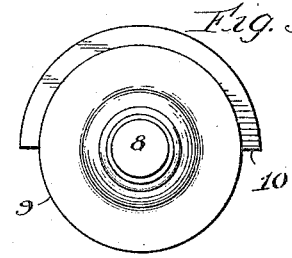
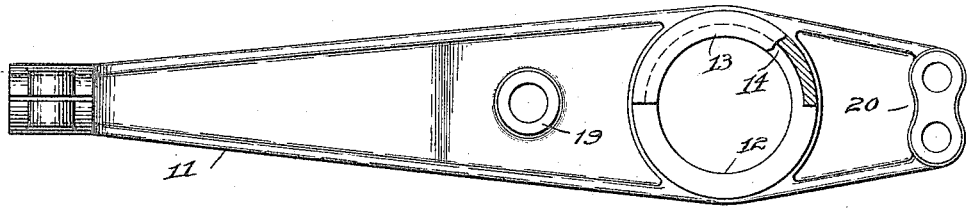
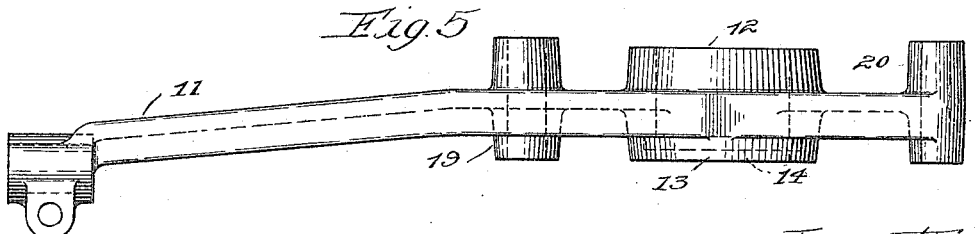
Witness:
R. C. Farrington
Inventor
Albert D. Smith
By Glenn S. Noble Atty.

UNITED STATES PATENT OFFICE.

ALBERT D. SMITH, OF CHICAGO, ILLINOIS, ASSIGNOR TO SMITH FORM-A-TRUCK COMPANY, A CORPORATION OF DELAWARE.

VEHICLE TORSION-ARM.

1,213,031.   Specification of Letters Patent.   Patented Jan. 16, 1917.

Application filed February 19, 1916. Serial No. 79,309.

*To all whom it may concern:*

Be it known that I, ALBERT D. SMITH, a citizen of the United States, residing at Chicago, in the county of Cook and State of Illinois, have invented certain new and useful Improvements in Vehicle Torsion-Arms, of which the following is a specification.

This invention relates more particularly to the distance piece or arm which is commonly used in connection with motor trucks or automobiles for keeping the proper alinement between the jack-shaft and rear axle. In chain driven motor trucks these members also serve to adjust the tension on the chains.

The principal objects of the present invention are to provide a simple and effective means for locking the arm to the axle; to provide a locking arrangement which will permit the oscillation of the arm on the axle, but will prevent its longitudinal movement on the axle; and in general, to provide such advantages as will appear more fully from the following description.

In the accompanying drawings illustrating this invention, Figure 1 is a fragmentary view of a motor truck, showing the rear axle and frame, with my improved torsion arm applied thereto; Fig. 2 is a detail showing the lock between the axle and arm; Fig. 3 is an end view of the axle; Fig. 4 is a side view of the arm, with a part broken away; and Fig. 5 is a plan view of the arm.

As illustrated in these drawings, 6 represents a truck or vehicle frame, having an axle 7, with spindles 8. The axle is provided with cylindrical enlargements or bearings 9, adjacent to the inner portions of the spindles. These bearings are provided at their inner ends with semi-circular lugs 10. In my preferred form of device, these parts are all formed integrally, although in some instances it might be found desirable to make them in one or more pieces. The torsion arm 11 is provided with a hub or sleeve 12, which fits over the bearing 9, and may rotate freely upon the same. The hub 12 is provided with an inwardly extending semi-circular lip 13, which forms a groove 14 for receiving the lug 10. In my preferred form of construction these parts are all cast integrally, although in some instances they may be made of separate parts if desired. The opposite end of the arm 11 is provided with any suitable form of turn buckle or adjusting arrangement, such as indicated at 15, with an eye 16 for engagement with a stud or bolt 17, for connecting it with a bracket 18. This connection is made substantially in alinement with the jack-shaft, so that the arm swings practically on a radius from the jack-shaft. The arm 11 is provided with lugs 19 and 20, with holes therethrough for fastening the brake attachments.

When the arm 11 is to be applied to the axle, it is swung around toward the back of the vehicle, and the hub 12 is shoved over the bearing 9, with the lip 13 underneath and in position to slip past the lug 10. It is then swung around to its normal position, as shown in Fig. 1, with the lip 13 extending inwardly over the lug 10, the latter fitting closely within the groove 14. In this position the necessary amount of oscillation will be permitted, while the arm will be prevented from longitudinal movement with respect to the axle. By means of this arrangement I do away with the usual collars, set screws and other attachments commonly used for holding the torsion arm in position, and provide an arrangement which is absolutely positive in action, and cannot work loose. When the arm is in operative position, as shown in Fig. 1, it will be seen that the lip 13 fully covers the lug 10 and acts in the nature of a cap for protecting the joint from mud or dirt.

Having thus described my invention, which, however, I do not wish to limit to the exact construction shown and described, except as specified in the following claims, what I claim and desire to secure by Letters Patent is:

1. The combination with a vehicle axle having an integrally formed locking member projecting therefrom, of a torsion arm having a hole through one end thereof for receiving said axle, and having an integrally formed locking member for engagement with the projection on said axle.

2. A vehicle axle having a bearing with a projection thereon, and a torsion arm engaging with said bearing and having a groove for receiving said projection, to prevent the longitudinal movement of the arm while permitting its oscillation.

3. The combination of a vehicle axle having an integrally formed semi-circular lug and a torsion arm engaging with said axle, and having a semi-circular lip forming a groove to receive said lug, the arrangement being such that the lip may be slipped past the lug when the arm is in one position, and will then engage with the lug when the arm is swung around to normal position.

4. In a motor vehicle, the combination of a frame, an axle having a bearing thereon, said bearing being provided with a semi-circular lug at its inner end, a distance rod or arm having a hub for engagement with said bearing, said hub being provided with a semi-circular lip on its inner end, and having a groove for receiving said lug, and adjustable means for securing the other end of the arm to the frame of the vehicle.

5. In a device of the character set forth, the combination with a vehicle axle having a circumferentially arranged segmental lug projecting upwardly therefrom, and a torsion arm having a hub engaging with the axle, said hub being provided with a segmental projection having a groove therein for receiving the lug when the arm is turned to bring the projection at the top of the axle.

ALBERT D. SMITH.

Copies of this patent may be obtained for five cents each, by addressing the "Commissioner of Patents, Washington, D. C."